June 22, 1926.
J. H. WAGENHORST
1,590,139
METHOD OF MAKING RIMS AND CLAMPS
Filed Jan. 20, 1923
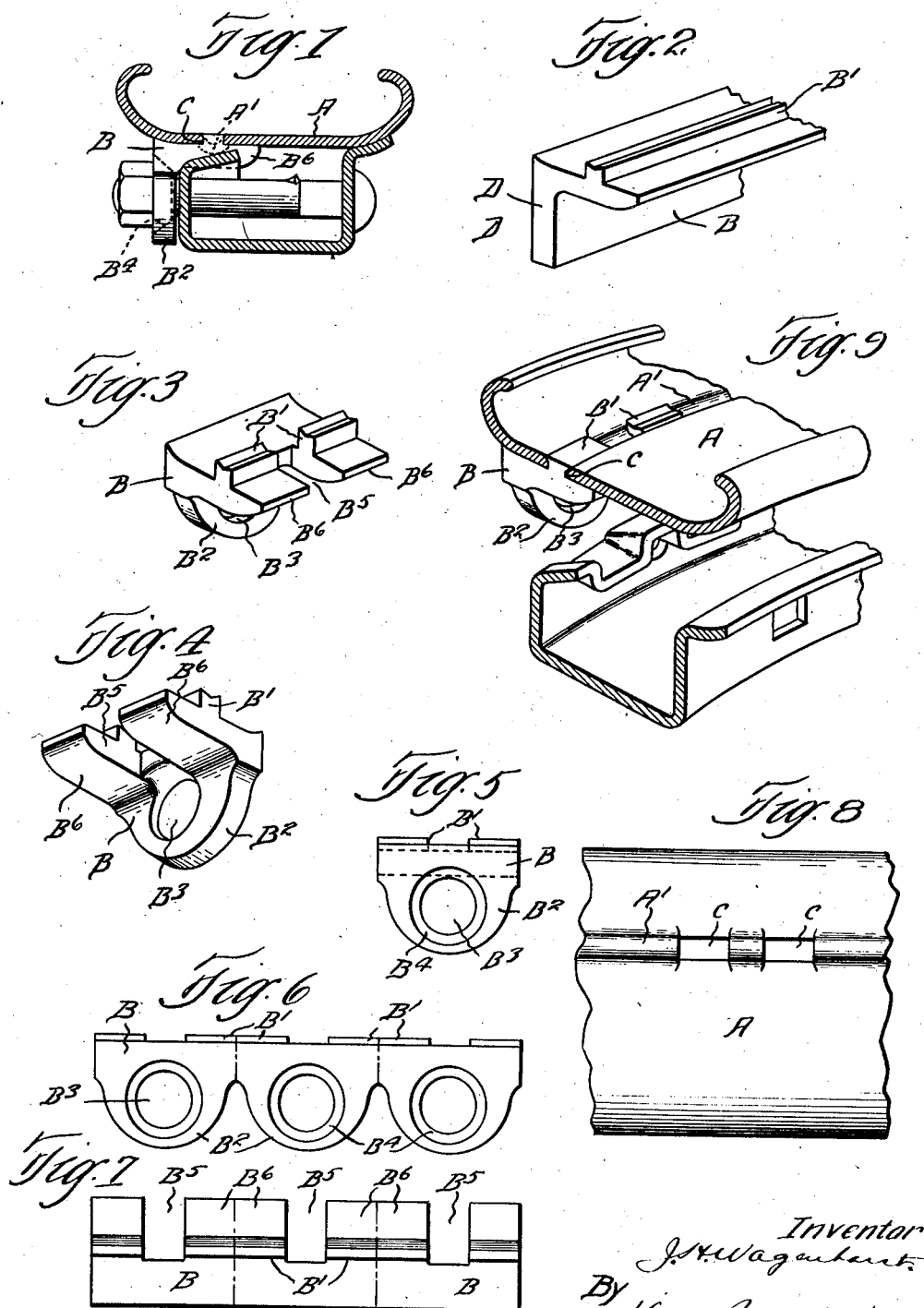

Patented June 22, 1926.

1,590,139

UNITED STATES PATENT OFFICE.

JAMES H. WAGENHORST, OF JACKSON, MICHIGAN.

METHOD OF MAKING RIMS AND CLAMPS.

Application filed January 20, 1923. Serial No. 613,835.

This invention relates generally to demountable tire carrying rims and more particularly to the method of making the rim and the fastening means, shown, described and claimed in my Patent No. 1,383,679, dated July 5, 1921 and of which this application is a continuation.

The object of the present invention is to provide a simple, economic, and efficient method of making the rim and fastening means disclosed in said patent, and another object is to so shape or form the various component parts and combine them in such manner as to produce a rim fastening means safely and securely connected thereto, capable of resisting all the strains and stresses to which said rim and fastening means may be subjected.

Another object of the invention is to provide a quick and simple method of making the clamps attached to the demountable tire carrying rim.

With these various objects in view, and certain others which will later appear, the invention consists in the various steps hereinafter fully described and set forth in the appended claims.

In the drawings forming a part of this specification, Fig. 1 is a view of a tire carrying rim constructed in accordance with my invention, said rim being shown applied to a fixed rim of the channel sheet metal type; Fig. 2 is a detail perspective view of a portion of a bar from which a plurality of the clamps are made; Fig. 3 is a detail perspective view of one of the clamps before being attached; Fig. 4 is a view of said clamp taken from the opposite side; Fig. 5 is a side elevation of the clamp; Fig. 6 is a side elevation of a bar, such as illustrated in Fig. 2 and showing the manner of cutting a plurality of clamps and boring the same; Fig. 7 is a top plan view of a bar after the second operation has been performed thereon showing the manner of bifurcating a plurality of clamps; Fig. 8 is an inverted plan view of a portion of the rim base; Fig. 9 is a sectional perspective showing the manner of connecting the clamp to the tire carrying rim.

In carrying out my invention, I first roll a demountable tire carrying rim A which may be of the clencher or straight side type as preferred, this rim being shaped into a true circle and sized to fit a definite size of wheel body.

This rim A is preferably formed with an inrolled bead A', but instead of the inrolled bead there may be an inwardly extending rib or the rim base may be flat; that is devoid of either inrolled bead or inwardly projecting rib.

The demountable tire carrying rim A has a series of clamps B permanently connected thereto and this invention pertains particularly to the method of making the clamps and also the method of connecting said clamps to the rim base.

Each clamp is substantially right angular in shape, one leg thereof being secured in engagement with the base of the rim, while the other leg thereof projects inwardly and is apertured to receive the fastening bolt, and each clamp when completed, is preferably provided with outwardly projecting lugs B' which serve as rivets for the attachment of the clamp to the rim base. The rim base has a series of openings C punched therein adjacent the outer side and when an inrolled bead is formed in the base of the rim, these openings C are produced in the inrolled bead and when an inwardly projecting rib is provided, these openings are produced in said rib and when a flat base rim is made, these openings C are produced in the base at substantially the same point as occupied by the inwardly projecting bead or rib, and in case each clamp is provided with two outwardly projecting lugs, the openings will be made so spaced apart as to receive said outwardly projecting lugs.

The finished clamps are placed in engagement with the rim base, or at least one member thereof is so placed and the outwardly projecting lugs B' pass through the openings or apertures C and these outwardly projecting lugs are then headed down or riveted as most clearly shown in Fig. 9, thereby rigidly and securely fastening the clamp to the tire carrying rim.

The inwardly projecting portion $B^2$ of the clamp is formed with a bolt hole $B^3$ which is counterbored as shown at $B^4$ and in practice I prefer to bifurcate the lug carrying member of the clamp, as shown at $B^5$ so as to provide spaced engaging members $B^6$.

According to my improved method the clamps are preferably constructed from a bar or hot rolled section D shown in Fig. 2, said bar being substantially right angular in shape and one member thereof provided with an outstanding rib, the outer face of which may be grooved if desired. This bar D is first operated upon to bore the holes, countersink them, and cut the contour of the inwardly projecting portion of the clamp. The bar is then turned over and bifurcations B⁵ made therein and the clamps cut apart and after the edges of the engaging members B⁶ are given the proper shape and rounded off, the clamp is ready to be attached to the tire carrying rim, the base of which has been previously punched to receive the outwardly projecting lugs B' which, as before stated, are headed or riveted down, thereby permanently and securely connecting the clamp to the rim.

It will be noted that when the rim is formed with an inrolled bead that the riveting of the lug B' takes place in this inrolled bead. Instead of shaping up the lugs from the bar as previously described, the bar could be subdivided and then the sections thereof bored, bifurcated and shaped to provide the finished clamp.

It will thus be seen that I provide a novel method of making the fastening clamps and also attach them to the rim in a novel manner in order to provide the desired construction of demountable tire carrying rim with fastening means.

When a flat rim base is employed and to which the clamps are to be attached I preferably provide at the points of attachment the equivalent of an inrolled bead for a distance equal to the width of the clamp and this inrolled or inwardly projecting portion is apertured to receive the outwardly projecting lugs exactly the same as the inrolled bead is apertured and these outwardly projecting lugs are riveted or upset in the inrolled portion exactly the same as in the inrolled bead, this inrolled bead or portion serving as a countersink to receive the riveted or upset portions of the upwardly projecting lugs.

Having thus described my invention, what I claim is:

1. The herein described method of making rim clamps which consists of rolling an angled bar having an outstanding rib upon one member thereof, then boring a plurality of bolt holes in one member of said bar, bifurcating the other member, and finally separating the bar into individual clamps.

2. The herein described method of making rim clamps which consists in rolling an angular bar with an outstanding rib on one member thereof, producing bolt holes in the other member at definite spaced points, producing a series of spaced lugs from the outstanding rib, and then cutting the bar into a plurality of separate clamps, each having a bolt hole in one member and one or more outstanding lugs in the other member.

3. The herein described method which consists in providing a circular rim base, punching apertures in the base thereof at predetermined points and near one side thereof, providing apertured clamps having outwardly projecting lugs, arranging said clamps in juxtaposition with the inner face of the rim base and passing the lugs through said rim base apertures, and then permanently connecting the clamps to the rim base by riveting or upsetting the outwardly projecting lugs into the rim base.

4. The herein described method which consists in providing a circular tire carrying rim and punching apertures in the base thereof at definite points and near one side thereof, providing an angular bar having an outwardly projecting rib on one member thereof, aperturing one member of said bar at definite points, punching out portions of the other member of said bar and then severing said bar at definite points so as to provide a plurality of angular clamps, one member of which is apertured and the other member provided with outstanding lugs, arranging said clamps in juxtaposition with the rim and fitting the outstanding lugs into the base apertures and riveting or upsetting said lugs in the rim base.

5. The herein described method which consists in providing a tire carrying rim and punching apertures in the base thereof at predetermined points, there being a plurality of adjacent holes at each point, providing a plurality of angular clamps each having a bored aperture in one member and a plurality of outwardly projecting lugs on the other member, arranging said clamps in contact with the rim base and passing the outwardly projecting lugs through the rim base holes and then permanently connecting the clamps to the rim base by riveting or upsetting the lugs in the rim base.

6. The herein described method which consists in providing a tire carrying rim having an inrolled bead and punching apertures in said bead at predetermined points, providing a plurality of angular clamps each having a bored aperture in one member and one or more outwardly projecting lugs on the other member, arranging said clamps in contact with the rim base and passing the outwardly projecting lugs through the openings in the bead and then permanently connecting the clamps to the rim base by riveting or upsetting the lugs in said inrolled bead.

7. The herein described method which consists in providing a tire carrying rim having an inrolled bead and punching apertures in said bead at predetermined points, providing a plurality of angular clamps each having a bored aperture in one member and one or more outwardly projecting lugs on the other member, arranging said clamps in contact with the rim base and passing the outwardly projecting lugs through the openings in the bead and then permanently connecting the clamps to the rim base by riveting or upsetting the lugs in said inrolled bead, said inrolled bead serving as a countersink to receive the riveted or upset portion of the outwardly projecting lugs.

In testimony whereof, I hereunto affix my signature.

JAMES H. WAGENHORST.